3,499,706
LEADER STRIP FOR PERFORATED STRIP MATERIAL
Everett L. Hanson, Los Angeles, and Jack P. Hall, Granada Hills, Calif., assignors to De Luxe Laboratories, Inc., New York, N.Y., a corporation of New York
Original application Dec. 28, 1965, Ser. No. 516,972, now Patent No. 3,346,158, dated Oct. 10, 1967. Divided and this application July 12, 1967, Ser. No. 652,768
Int. Cl. G03c 1/76
U.S. Cl. 352—235          2 Claims

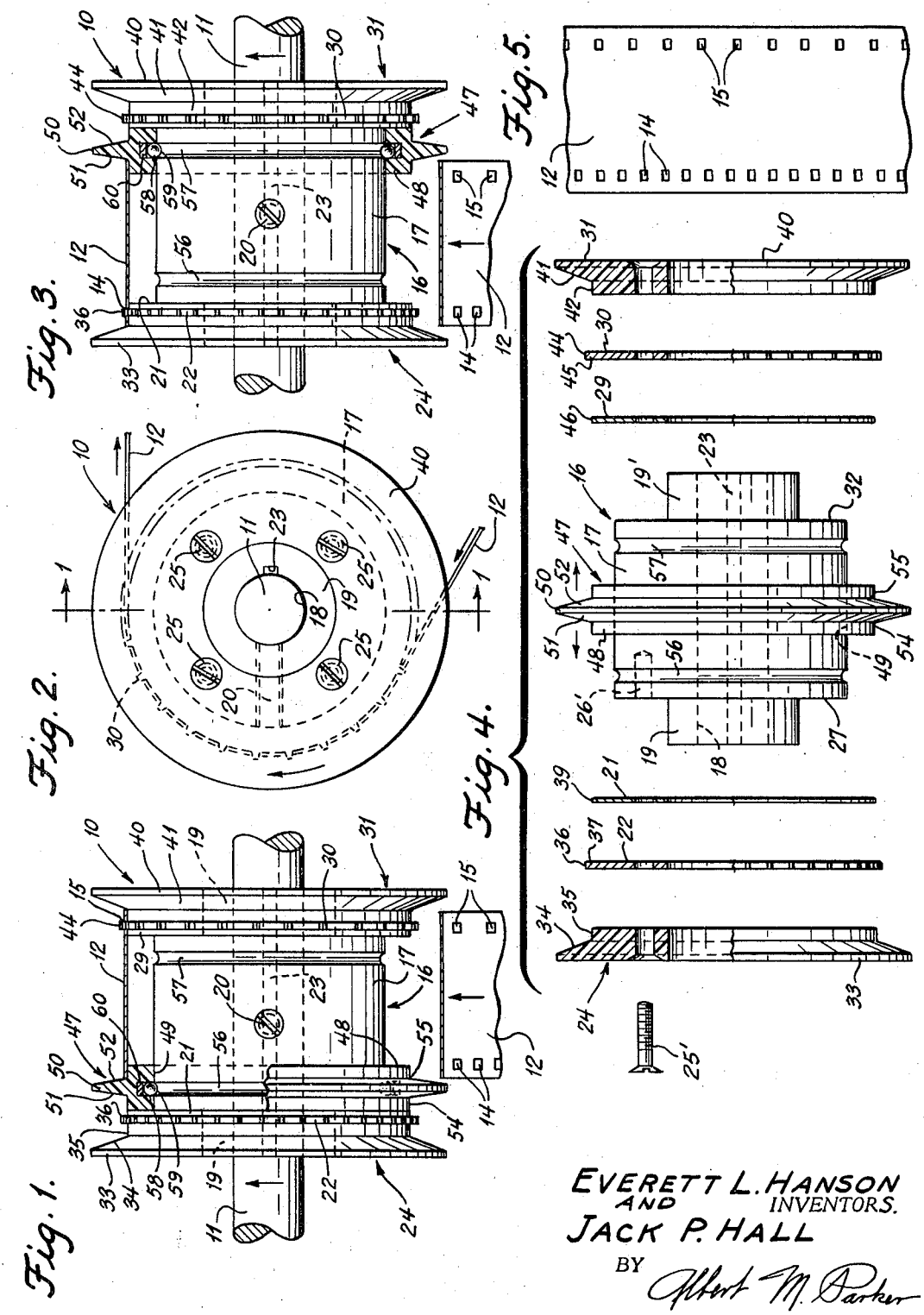
March 10, 1970    E. L. HANSON ET AL    3,499,706
LEADER STRIP FOR PERFORATED STRIP MATERIAL
Original Filed Dec. 28, 1965
EVERETT L. HANSON
AND JACK P. HALL
INVENTORS.
BY
ATTORNEY.

ABSTRACT OF THE DISCLOSURE

A motion picture film leader strip of a width equal to the width of a standard perforated film strip. The leader strip has a row of perforations along each side, the row of perforations along one side being of a standard size and pitch for one type of film and the perforations along the opposite side being of a different standard size and pitch for a different type of film. The leader strip is for use with processing equipment employing two dissimilar selectively operable sprockets for selectively processing different types of film.

CROSS-REFERENCE TO RELATED APPLICATION

This application is a division of application Ser. No. 516,972, now Patent No. 3,346,158 filed Dec. 28, 1965.

BACKGROUND OF THE INVENTION

Field of the invention

The invention relates to a leader strip for feeding strip material having sprocket-receiving perforations.

Description of the prior art

Most sprocket driven film handling machines, by virtue of their design and construction, are capable of handling films of only one standard size perforation and pitch. While sprocket devices have been proposed for film transport devices handling films having more than one perforation size and pitch, they have all failed to meet the needs of the industry, because they are either too expensive, too difficult or time-consuming to install, too complicated for reasonable maintenance, too difficult to change over, or too wasteful of space. Such prior sprocket mechanisms have employed standard film leader strips with perforations of the same size, shape, and spacing along their opposite edges.

SUMMARY OF THE INVENTION

The sprocket mechanism shown herein is designed to obviate these difficulties and is constructed to permit the easy handling of films having two or more perforation and pitch dimensions. The thread-up leader of the present invention is adapted for use with such sprocket mechanism. With such sprocket mechanism, any combination of perforation size, shape and pitch can be accommodated that will run on the disclosed sprocket device, which employs two dissimilar selectively operable sprockets. For example, the thread-up leader to be used with the disclosed sprocket mechanism could have 35 mm. perforations on one edge and 35/32 or 16 mm. perforations on the other edge. Thus, when 35 mm. film is to be transported through a given piece of equipment, the disclosed sprocket mechanism is adjusted to guide the film onto the 35 mm. sprocket and at the same time support the edge of the film opposite such sprocket. If 35/32 mm. film is directly to follow through the given equipment, the dual perforated thread-up leader is run completely through the machine. The machine is then stopped, and the sprockets are adjusted to guide the film onto the other, 35/32 mm. sprocket and at the same time support the opposite edge. Machine speed and design permitting, these changes can be effected, one sprocket at a time, while the machine is still running. By use of the disclosed sprocket mechanism, many pieces of motion picture equipment can be readily converted to multipurpose machines.

The invention provides a novel strip material having a plurality of rows of perforations of different characters therein, such strip material being useful, for example, as a film strip leader for the disclosed sprocket mechanism.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

BRIEF DESCRIPTION OF THE DRAWING

In the drawings, wherein like reference characters refer to like parts throughout the several views, FIG. 1 is a view partially in side elevation and partially in vertical axial section of an illustrative embodiment of sprocket device in accordance with the invention, the section being taken along the line 1—1 of FIG. 2 looking in the direction of the arrows, the film strip being driven by the right-hand sprocket of the device as it is shown in FIG. 1;

FIG. 2 is a view in end elevation of the sprocket device, the view being taken in the direction from right to left in FIG. 1;

FIG. 3 is a view similar to FIG. 1, but with the shiftable flange of the sprocket device moved to the right from the position thereof shown in FIG. 1 and with the film strip driven by its engagement of the left-hand sprocket of the device;

FIG. 4 is an exploded view of the sprocket device of FIGS. 1, 2, and 3; and

FIG. 5 is a fragmentary view in front elevation of a section of the film strip with which the sprocket device is shown cooperating in FIGS. 1, 2, and 3.

DESCRIPTION OF THE PREFERRED EMBODIMENT

The illustrative sprock device, which is generally designated by the reference character 10, is shown mounted on a driven shaft 11. As the sprocket device is illustrated, the film strip 12, which in this instance is a leader strip, approaches the sprocket device from right to left along an upwardly inclined path (FIG. 2), passes partially around the sprocket device, and leaves the device in a horizontal direction from left to right. As above explained the sprocket device may be employed in a variety of strip handling and/or processing mechanisms. It may be the only strip-forwarding means of a given mechanism, or it may be one of a plurality of serially disposed strip-forwarding means.

The film leader strip 12 of the invention has a row of sprocket tooth-receiving holes or perforations 14 of one character along one edge thereof and a row of sprocket tooth-receiving perforations 15 of a different character along its other edge. The leader strip 12 may thus be employed as a leader for a strip of film bearing only one of the rows 14 and 15 of perforations. In the strip shown the perforations 14 are of the type designated "35 mm." whereas perforations 14 are of the type designated "35/32 mm."

The sprocket device 10 has a body 16 which has a central circular cylindrical hub portion 17 and smaller diametered bosses 19 and 19' at the respective ends of body 17 and concentric therewith. Body 16, which may be made of strong, substantially rigid plastic material, is provided with a central circular cylindrical bore 18 therethrough which receives the shaft 11 upon which the sprocket device is mounted. In the embodiment shown, the sprocket device is fixedly held upon shaft 11 by means of a set screw 20 which extends radially inwardly of the portion 17 into engagement with the shaft 11. Alternatively, the sprocket device may be secured to shaft 11 by means of a key (not shown) which would be received within an axially extending groove in the shaft and the keyway 23 in the member 16.

The construction of the sprocket device 10 will be more readily understood by consideration of the exploded view of such deivce in FIG. 4. Beginning at the left-hand end of the member 16, there are fitted upon the boss 19 at such end a spacer washer 21 which may be made, for example, of plastic material, a sprocket disc 22 which may be made of metal such as stainless steel, and an end flange member 24, which may be made of a plastic material similar to that from which body 16 is made. Each of such three members is provided with an axial circular cylindrical bore which accurately receives the left-hand boss 19. Parts 21, 22, and 24 are held in face-to-face relation, with the washer 21 tight against the left-hand end surface 27 of body 17, by a plurality (four actually employed) of machine screws 25' which extend through aligned bores in the members 21, 22, and 24 and are threadedly received within tapped bores, of which one is shown at 26', in the left-hand end surface of the body 17.

The construction of the right-hand end of the sprocket device 10 is similar to that of the above described left-hand end thereof, but for clarity different reference characters are employed to designate such parts. Thus starting from the right-hand end surface 32 of the body 17 there are mounted upon the boss 19' at such end a spacer washer 29, a sprocket disc 30, and an end flange member 31. Members 29, 30, and 31 are retained upon the boss 19' by means of four machine screws 25 (FIG. 2) which extend through aligned bores in the members 29, 30, and 31 and are threadedly received in tapped holes (not shown) similar to the above described holes 26' at the left-hand end of the body 17.

The flange member 24 at the left-hand end of the sprocket device has a rim 33 having a frusto-conical inner surface 34 which converges toward the axial center of the body 16. Surface 34 terminates radially inwardly at a circular cylindrical root surface 35 above which the teeth 36 on the sprocket disc 22 protrude. Surface 35 has a diameter which markedly exceeds that of portion 17 of body 16. The root surfaces 37 between successive teeth 36 lie on the same cylinder as the surface 35. The peripheral surface 39 of the spacer washer 21 lies on the same cylinder as surfaces 35 and 37. Thus, as shown in FIG. 3, when the sprocket device 10 is employed to drive a film strip by means of the sprocket disc 22, the edge of the film strip which bears the holes receiving the sprocket teeth 36 is supported upon the surfaces 35, 37, and 39.

The flange member 31 affixed to the right-hand end of the body 16 of the sprocket device is constructed similarly to the above described flange member 24. Thus member 31 has a rim 40 having an axially inwardly converging frusto-conical surface 41 and a circular cylindrical root surface 42. The teeth 44 on the sprocket disc 30 protrude radially outwardly of the surface 42, the root surfaces 45 between successive teeth 44 lying on the same cylinder as the surface 42. The spacer washer 29 has the periphery 46 thereof lying on the same circular cylinder as surfaces 42 and 45. When the sprocket device is employed in the manner shown in FIG. 1, that is, with the film strip driven by the teeth on the sprocket disc 30, the edge of the film strip which bears the holes receiving the teeth 44 is supported by the surfaces 42, 45, and 46.

In order to provide for the support of the undriven edge of the film strip, the sprocket device 10 is provided with an intermediate flange members 47 which is slidable longitudinally of the body 17 of the device from one terminal position, shown in FIG. 1 at the left-hand end of the body 17, into another terminal position (FIG. 3) at the right-hand end of the body 17. Member 47 may be made, for example, of plastic material similar to that from which body 16 and flange members 24 and 31 are made. Member 47 has a central sleeve-like body 48 having a central bore 49 which accurately but slidably receives the outer surface of the body 17 of the device. Member 47, which is symmetrical in an axial direction, is provided with an axially central rim member 50 having a left-hand frusto-conical surface 51 and a right-hand frusto-conical surface 52 which converge in axially opposite directions. The surface 51 terminates at a circular cylindrical root 54 on the left of member 47 and the surface 52 terminates at a similar circular cylindrical root 54 at the right-hand end of body 47. In the preferred embodiment shown, root surfaces 54 and 55 lie on the same circular cylinder as the above described surfaces 35, 37, 39, 42, 45, and 46, but such surfaces 54 and 55 may, if desired, have a diameter different from that of said cylinder.

When the member 47 is in its left-hand position (FIG. 1), the left-hand end surface of its body 48 contacts the spacer washer 21. Conversely, when the member 47 is in its right-hand position (FIG. 3), the right-hand end of its body 48 contacts the spacer washer 29. In both of such positions the roots of the inclined guiding surfaces on the respective end flange and the respective side of the central slidable flange member 47 are spaced a distance which equals, with a slight plus tolerance, the width of the film strip 12.

The device 10 includes means whereby the central slidable flange member 47 is stably retained in each of its two terminal positions. In the embodiment shown, such retaining means take the form of two axially spaced annular grooves 56 and 57 which are part-circular in section. The body 48 of member 47 is provided with a plurality of angularly spaced radial bores 58 within each of which is disposed a ball 59. Disposed in such bores 58 radially outwardly of the ball 59 is a resilient insert 60 which may be made, for example, of neoprene. The relationship of the parts is such that when the flange is thrust into either of its axially terminal positions the balls 57 are thrust into the respective annular groove thus to hold the member 47 stably in such terminal position. The member 47 can, however, be slid axially of the body 16 without undue effort. When thus moved from one terminal position, the balls 59 are thrust outwardly of the groove 56 or 57, and ride along the surface of portion 17 of body 16 until the member 47 reaches its other terminal position, at which time the balls 59 fall partially into the other of such annular grooves.

The advantages of the disclosed sprocket device will be largely apparent from the above description of it. It is simple and rugged in construction, and is easily operated to shift it from one strip engaging and driving position to the other. In both of its shifted or adjusted positions, the sprocket device supports the strip of material only at its edges, the main, intermediate portion of the strip being free from contact with any portion of the sprocket device in the passage of the strip material thereabout. The main, central portion of the strip material thus can not be scuffed by the sprocket device, which is important in the transporting of strip film.

As above indicated, the intermediate flange member 47 may be shifted from one to the other of its operative positions while the sprocket device is in operation. This may be done, for example, by forming a loop in the film strip, as by an idle roller, so as to lift the strip from engagement with the sprocket device and above the intermediate flange member 47. The member 47 can then be slid to its other operative position, following which the loop of film is shifted laterally as required, and allowed to engage the sprocket device in its new position.

The disclosed sprocket device is of advantage in that the first path of a film strip in the operation of the device, in its position shown in FIG. 1, is laterally displaced from the second path of a film strip, in the position of the device shown in FIG. 3, for a distance which is but a small fraction of the width of the film strip. This minimizes the distortion of the leader film strip 12 which occurs between successive sprocket devices when the strip 12 is temporarily running in a first path over a first sprocket device and in a second path over a second sprocket device.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

What is claimed is:

1. In combination with an elongated film strip having a plurality of matched aligned equally spaced perforations along both of its side edges, a leader strip of flexible material, said leader strip having two rows of sprocket tooth-receiving holes, the first of said rows of holes being disposed along one edge of the leader strip in alignment with said perforations along one side of said film strip and the holes in said first row having a size and pitch equal to said perforations of said film strip, the second said row of holes being disposed along the other edge of the leader strip, the holes in said second row being of a different pitch from the holes in said first row.

2. The combination according to claim 1, said first row of holes being of the 35 mm. type and said second row of holes being of the 35/32 mm. type.

References Cited

UNITED STATES PATENTS 1,065,135   6/1913   Ivatts _____ 352—235

NORTON ANSHER, Primary Examiner

M. H. HAYES, Assistant Examiner

U.S. Cl. X.R.

352—241